United States Patent [19]

Ichikawa

[11] Patent Number: 5,325,575

[45] Date of Patent: Jul. 5, 1994

[54] METHOD AND APPARATUS FOR ASSEMBLING COMPONENT PARTS

[76] Inventor: Eiichi Ichikawa, 7-20, Chiyoda 2-chome, Naka-ku, Nagoya-shi, Aichi-ken, Japan

[21] Appl. No.: 736,752

[22] Filed: Jul. 26, 1991

[30] Foreign Application Priority Data

Jul. 27, 1990 [JP] Japan .............................. 2-200988

[51] Int. Cl.$^5$ .............................................. B23P 19/02
[52] U.S. Cl. ................................ 29/281.3; 29/281.5; 29/732; 29/760
[58] Field of Search ............... 29/466, 281.1, 281.3, 29/281.5, 700, 729, 732, 757, 760; 269/287

[56] References Cited

U.S. PATENT DOCUMENTS

| | | | |
|---|---|---|---|
| 3,414,962 | 12/1968 | Altamura | 29/760 X |
| 3,518,752 | 7/1970 | Lentz | 29/760 X |
| 3,689,985 | 9/1972 | Nier | 29/466 X |
| 3,785,035 | 1/1974 | Busler et al. | 29/757 X |
| 4,487,649 | 12/1984 | Gyi et al. | 29/466 X |

FOREIGN PATENT DOCUMENTS

| | | | |
|---|---|---|---|
| 236631 | 10/1987 | Japan | 29/466 |
| 63-109929 | 5/1988 | Japan . | |
| 0596408 | 3/1978 | U.S.S.R. | 29/757 |

*Primary Examiner*—Joseph M. Gorski
*Attorney, Agent, or Firm*—Venable, Baetjer, Howard & Civiletti

[57] ABSTRACT

A method and apparatus for assembling component parts of a product manufactured by assembling a plurality of kinds of component parts coaxially. First, component parts of one kind are held by a reference jig and component parts of another kind by a superposing jig. Then, the component parts held by the superposing jig are made to approach the component parts held by the reference jig and are fitted thereto by being pushed in by pushers, while the superposing jig is being guided through insertion of guide rods disposed on the reference jig into respective guide holes provided in the superposing jig such that the axis of each component part held by the superposing jig is aligned with the axis of each component part held by the reference jig, to thereby form subassemblies. Finally, component parts of still another kind held by another superposing jig are assembled to the subassemblies in a manner similar to the second step.

24 Claims, 19 Drawing Sheets

METHOD AND APPARATUS FOR ASSEMBLING COMPONENT PARTS

BACKGROUND OF THE INVENTION

1. Field of the Invention

The present invention relates to a method and an apparatus for assembling component parts of products manufactured by assembling a plurality of component parts coaxially.

2. Description of the Related Art

In manufacturing products by assembling a plurality of component parts coaxially, e.g., in manufacturing motors by assembling various component parts such as a stator and a rotor in a yoke, jigs are generally used to assemble the various component parts.

Conventionally, in the case of motors, for instance, after individual parts such as stators and rotors are fabricated, the individual parts are fetched separately for each kind, and are assembled by means of jigs provided independently for each kind of component parts. That is, with the conventional method and apparatus for assembling component parts, the jigs for assembling the component parts as well as the assembling processes are made independent of each other and, hence, lacked interrelatedness in the operation.

For this reason, it has been difficult to set the assembling processes in a continuous manner and assemble a plurality of products simultaneously, so that there has been the problem that the operational efficiency in assembly is poor.

SUMMARY OF THE INVENTION

In view of the above-described circumstances, it is an object of the present invention to provide a method and an apparatus for assembling component parts which are capable of improving the operational efficiency in an assembling process at the time of assembling component parts of products manufactured by assembling a plurality of component parts coaxially.

To this end, in accordance with one aspect of the present invention, there is provided a method for assembling component parts of a product manufactured by assembling a plurality of kinds of component parts coaxially, comprising the steps of: holding component parts of the plurality of kinds by means of a plurality of jigs, respectively; guiding a first jig holding a first component part toward a second jig holding a second component part in such a manner that an axis of the first component part is aligned with an axis of the second component part; causing the first jig holding the first component part to approach the second jig holding the second component part; fitting the first component part held by the first jig to the second component part held by the second jig, to thereby form a subassembly; guiding another jig holding a component part of another kind toward the second jig holding the subassembly in such a manner that an axis of the component part of said another kind is aligned with an axis of the subassembly; causing said another jig holding the component part of said another kind to approach the second jig holding the subassembly; and fitting the component part of said another kind held by said another jig to the subassembly held by the second jig, thereby assembling the component part of said another kind to the subassembly.

In accordance with this aspect of the invention, since the component parts can be assembled by the simple process of fitting component parts held by a jig, by means of an assembling jig, the operational efficiency improves. In addition, since the component parts are held as assembled to the jig on each occasion of forming a subassembly, the component parts as thus held can be transported or stored is the partly assembled state.

In accordance with another aspect of the present invention, there is provided an apparatus for assembling component parts of a product manufactured by assembling a plurality of kinds of component parts coaxially, comprising: a reference jig for holding a component part of one of the plurality of kinds; a superposing jig for holding a component part of another kind of the plurality of kinds; guide means for guiding the superposing jig toward the reference jig in such a manner that an axis of the component part held by the superposing jig is aligned with an axis of the component part held by the reference jig; and an assembling jig for assembling the component part held by the superposing jig to the component part held by the reference jig.

In accordance with this aspect of the present invention, an assembling process can be effected by a simple process in which component parts are held by a reference jig and a superposing jig, the superposing jig is guided by the guide means such that the axes of the component parts are aligned with each other, and after the superposing jig is superposed on the reference jig, the component part held is pushed in by a pusher. Thus the operating efficiency is improved. In addition, by preparing superposing jigs in correspondence with the number of kinds of component parts, and by repeating the step of superposing the superposing jig on the reference jig and pushing in the component part, it is possible to assemble products irrespective of the number of kinds of component parts, thereby expanding the applicable range of production. Furthermore, since the component parts are held as assembled to the jig on each occasion of forming a subassembly, the component parts thus held can be transported or stored is the partly assembled state.

The above and other objects, features and advantages of the present invention will become more apparent from the following detailed description of the invention when read in conjunction with the accompanying drawings.

DESCRIPTION OF THE PREFERRED EMBODIMENT

Figure 1A:
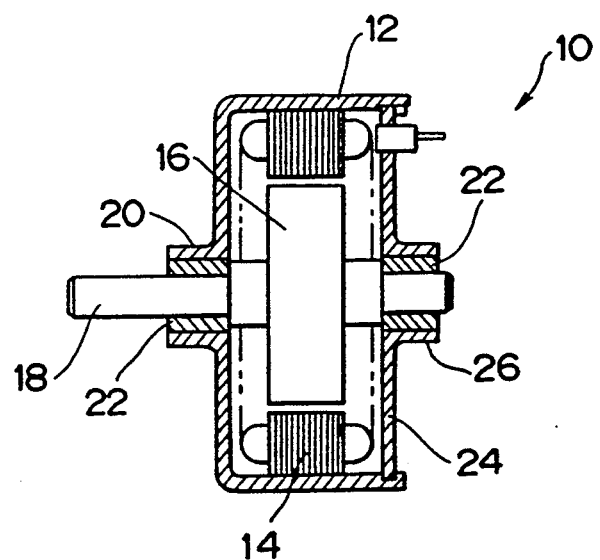
FIG. 1A is an overall cross-sectional view of a motor assembled by applying a method and an apparatus for assembling component parts in accordance with the present invention.
Figure 1B:
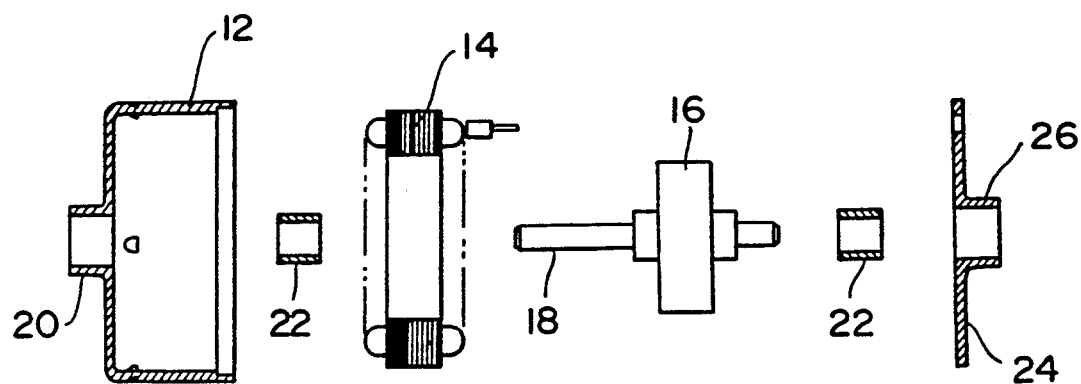
FIG. 1B is an exploded cross-sectional view of component parts of the motor.

FIG. 1A shows an overall cross-sectional view of a motor 10 assembled by applying a method and apparatus for assembling component parts in accordance with the present invention. FIG. 1B shows component parts of the motor 10 in an exploded cross-sectional view.

The motor 10 is a product which is manufactured by assembling a plurality of component parts coaxially. Specifically, a stator 14 is fixed to the inner peripheral surface of a cylindrical yoke 12, and a rotor 16 is fixed on a shaft 18 inside the stator 14. One side of the shaft 18 is rotatably supported via a sintered bearing 22 by a bearing portion 20 formed in a bottom portion of the yoke 12, while the other side of the shaft 18 is rotatably supported via another sintered bearing 22 by a bearing portion 26 formed on an end cover 24.

Figure 2:
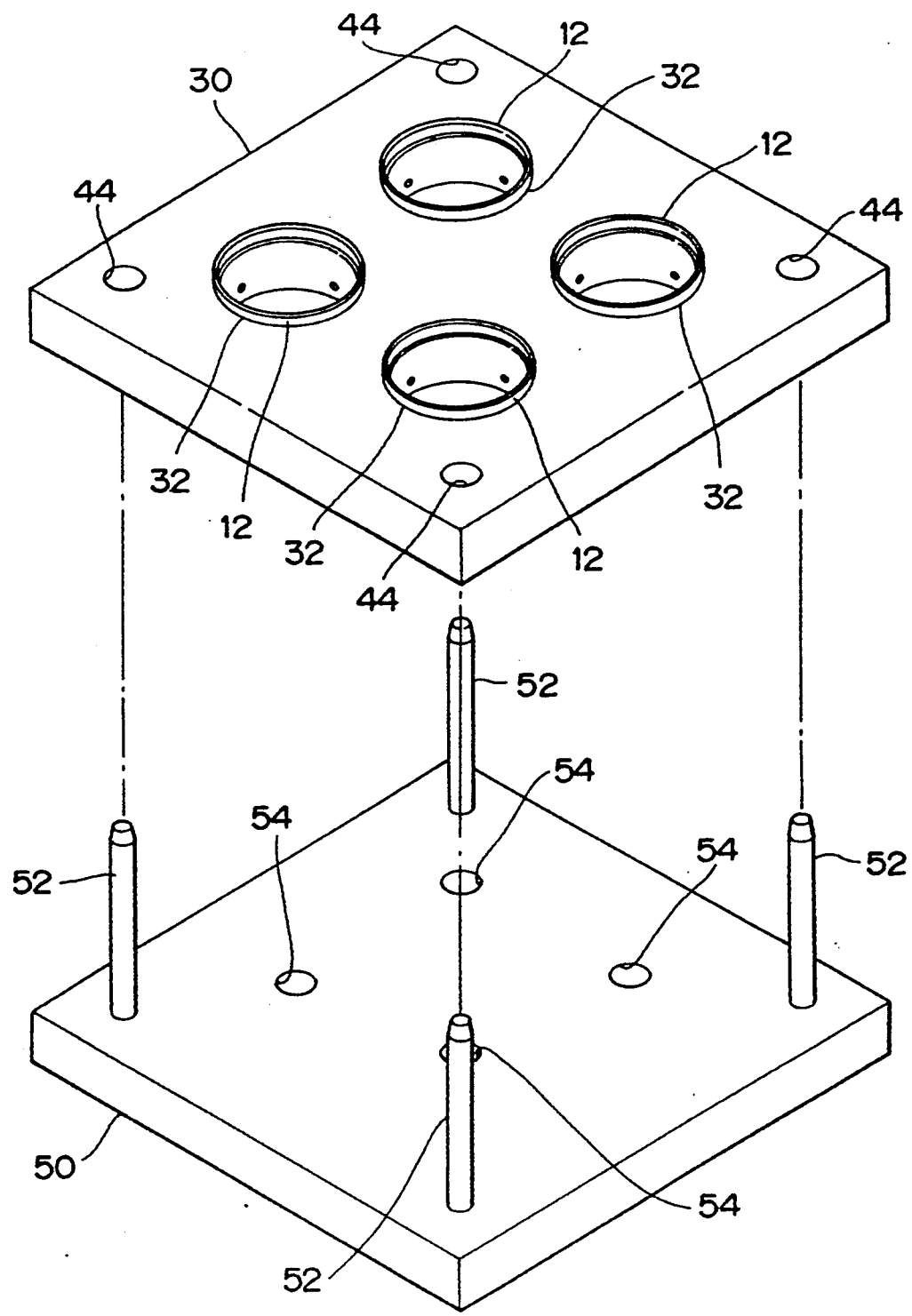
FIG. 2 is a perspective view of a pair of base pallets serving as reference jigs.
Figure 3:
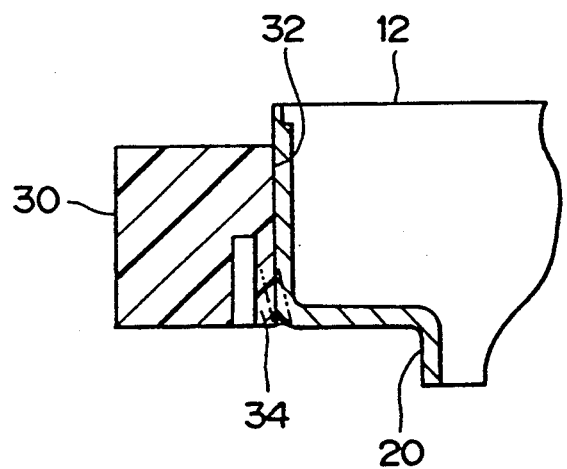
FIG. 3 is a partial cross-sectional view illustrating a holding hole provided in the base pallet.

As shown in FIG. 2, a reference jig comprises a pair of base pallets 30 and 50. The base pallet 30 is formed of a resin, and a plurality of (in this embodiment four) holding holes 32 are bored in it so as to hold the yokes 12 of the respective motors 10. As shown in detail in FIG. 3, a holding projection 34, which is capable of undergoing resilient deformation and is normally bent inwardly in the radial direction of the holding hole 32, is formed on a lower end of the inner wall surface of each holding hole 32. When the yoke 12 of the motor 10 is inserted in the holding hole 32, this holding projection 34 is adapted to press the yoke 12 by undergoing resilient deformation so as to hold the yoke 12.

Figure 4A:
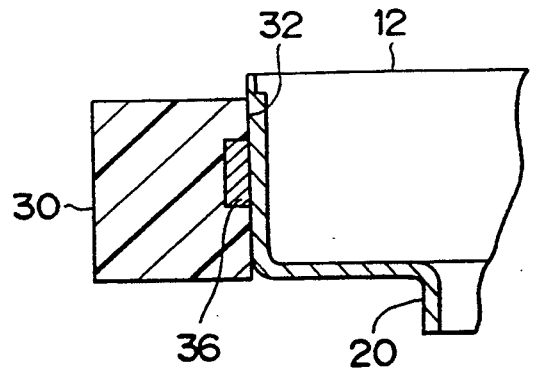
FIGS. 4A to 4C are partial cross-sectional views illustrating other examples of the holding hole in the base pallet.
Figure 4B:
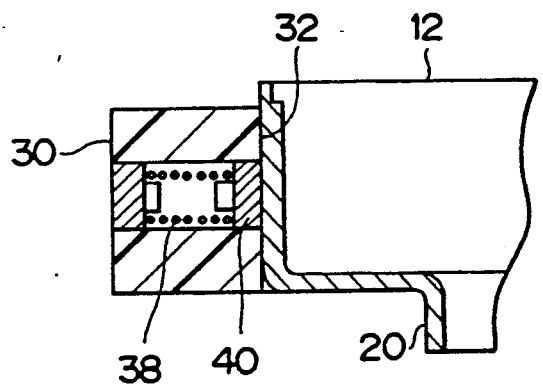
Figure 4C:
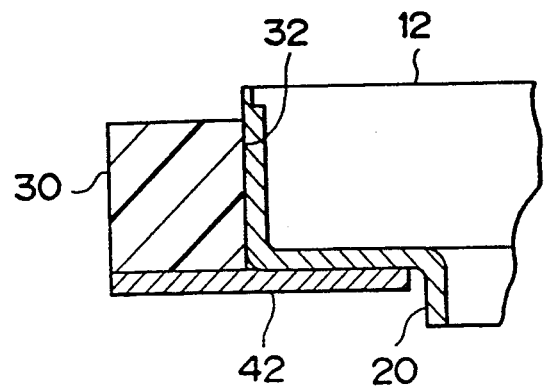

It should be noted that the mechanism for holding the yoke 12 is not restricted to the above-described structure, and other holding mechanisms may be adopted. For instance, as shown in FIG. 4A, an arrangement may be provided such that a permanent magnet 36 is attached to the inner wall surface of the holding hole 32 so as to attract and hold the yoke 12. In addition, as shown in FIG. 4B, an arrangement may be provided such that a pressing piece 40 urged inwardly in the radial direction of the holding hole 32 by means of a compression spring 38 is disposed in the inner wall surface of the holding hole 32 so as to press and hold the yoke 12. Furthermore, as shown in FIG. 4C, an arrangement may be provided such that a holding plate 42 may be disposed at the bottom of the holding hole 32.

Meanwhile, the base pallet 50 is formed of a metal (iron), and a guide rod 52 is mounted in the vicinity of each corner thereof. This guide rod 52 is adapted to be inserted in a guide hole 44 formed in the base pallet 30. As the guide rods 52 are inserted in the respective guide holes 44, the base pallet 30 can always be superposed on the base pallet 50 in proper alignment therewith. Four through holes 54 are formed in the base pallet 50 in correspondence with the holding holes 32 of the base pallet 30, so that when the base pallet 30 is superposed on the base pallet 50, the through holes 54 are aligned with the holding holes 32, respectively. In addition, in this state, the bearing portion 20 at the bottom of the yoke 12 which is held by the base pallet 30 is adapted to be fitted in the through hole 54.

Superposing jigs comprise a plurality of container pallets 60, 74, 82, 90 (see FIGS. 5, 8, 11, and 17). The respective container pallets basically have the same structure. Meanwhile, assembling jigs comprise a plurality of pushers 70, 80, 88, 96 and calking tools 98 (see FIGS. 6, 9, 12, 18, and 21). The pushers 70, 80, 88, 96 correspond to the container pallets 60, 74, 82, 90 and basically have the same structure.

Figure 5:
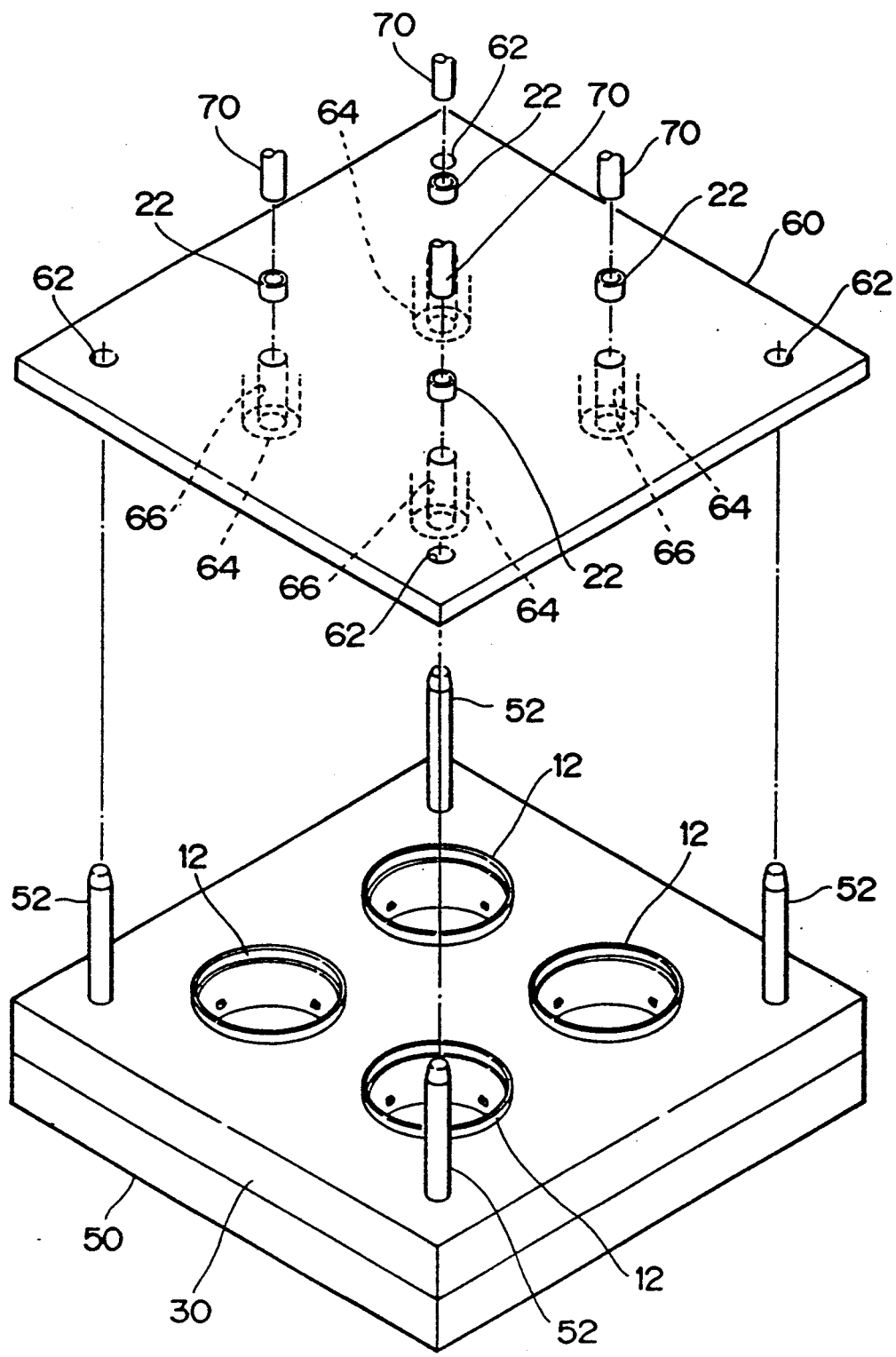
FIG. 5 is a perspective view illustrating a pallet for assembling sintered bearings which are assembled to yokes, respectively.

As shown in FIG. 5, the container pallet 60 is used for holding the sintered bearings 22, and guide holes 62 are respectively formed in the vicinity of the corners of the container pallet 60 in correspondence with the guide rods 52 disposed on the base pallet 50. As the guide rods 52 are inserted in the guide holes 62, the container pallet 60 can always be superposed on the base ballet 30 in proper alignment therewith after the base pallet 30 is superposed on the base pallet 50.

Figure 6:
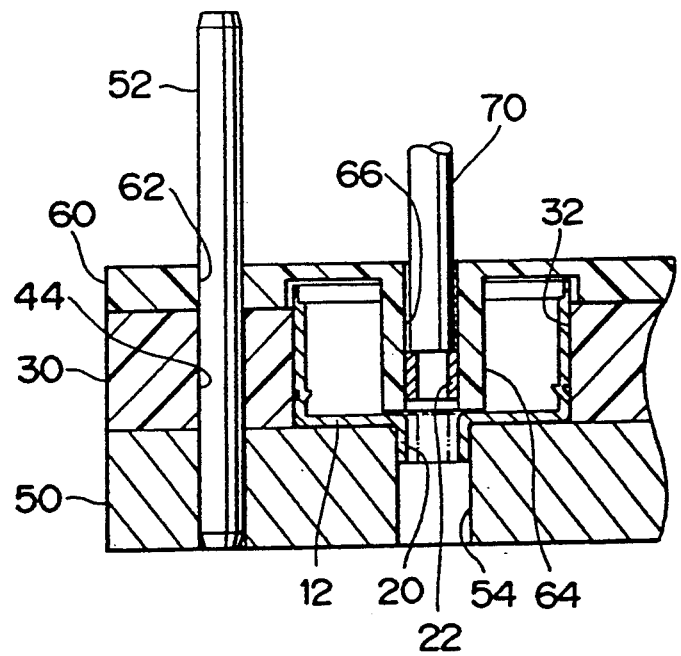
FIGS. 6 and 7 are partial cross-sectional views of the base pallets and illustrate a state in which the sintered bearing is assembled to the yoke.

As shown in FIG. 6, holding portions 64 are formed in the container pallet 60 in such a manner as to project into the respective holding holes 32 when the container pallet 60 is superposed on the base pallet 30. In addition, holding holes 66 are respectively formed in the holding portions 64 coaxially therewith. Each holding hole 66 is capable of holding the sintered bearing 22 by means of a mechanism similar to that of the holding hole 32 of the base pallet 30. When the container pallet 60 is superposed on the base pallet 30, the holding holes 66 are adapted to be aligned with the holding holes 32 and the through holes 54 of the base pallet 50.

The pushers 70 correspond to the container pallet 60 and are capable of being inserted into the holding holes 66 of the container pallet 60. These pushers 70, when inserted in the holding holes 66, are capable of pushing the respective sintered bearings 22 held in the holding holes 66, and of pushing the sintered bearings 22 outwardly of the holding holes 66.

Figure 8:
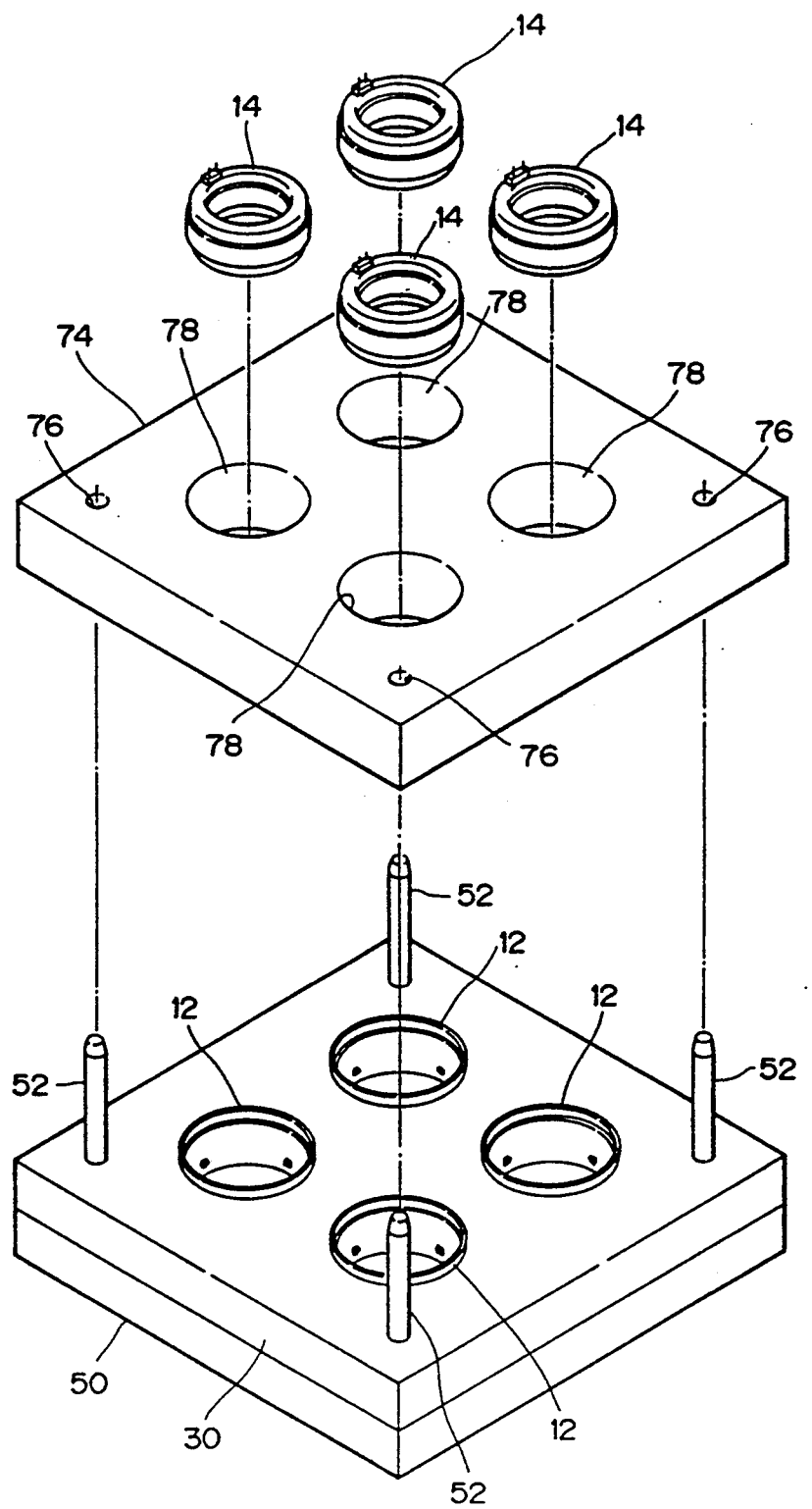
FIG. 8 is a perspective view illustrating a pallet for assembling stators.
Figure 11:
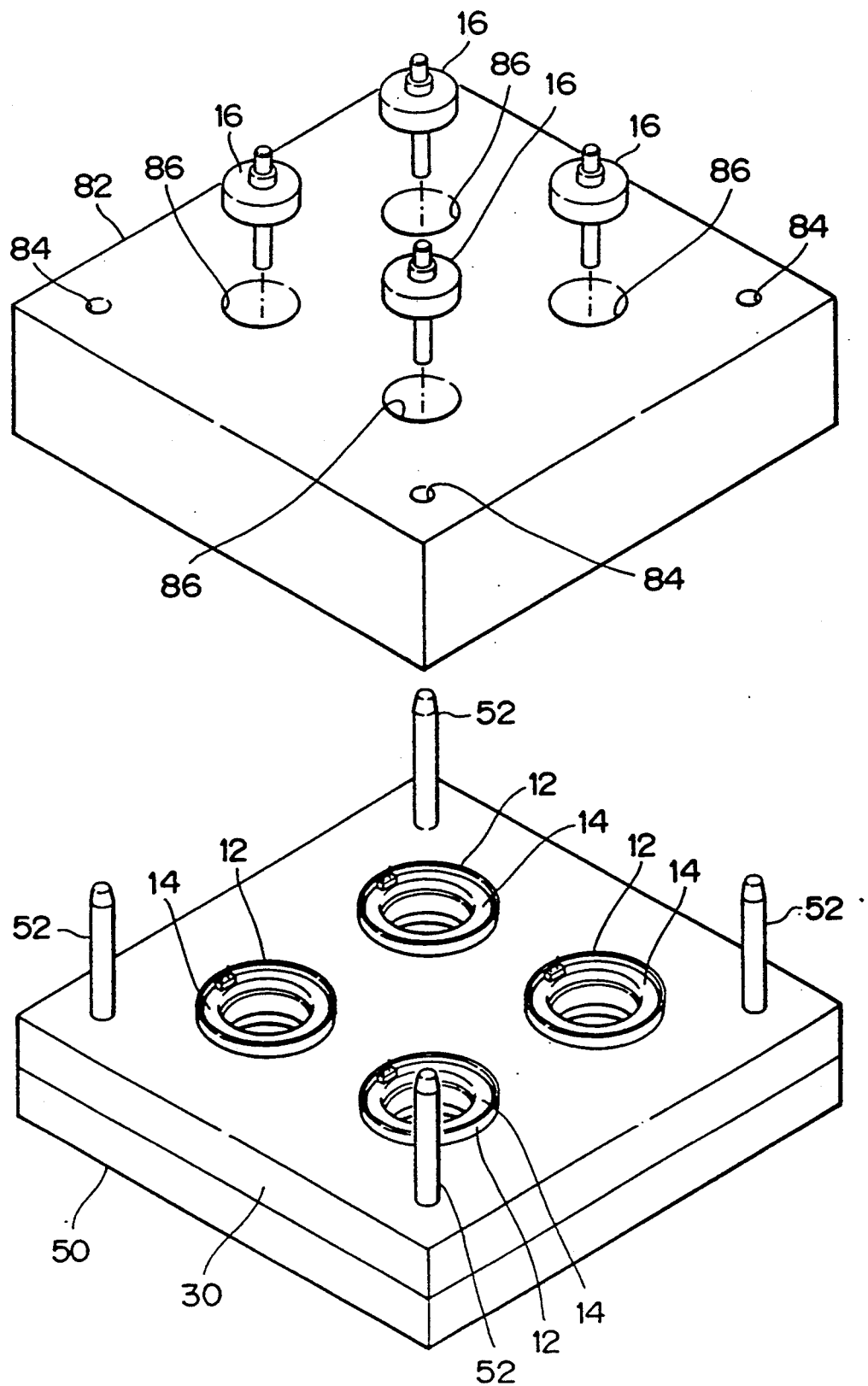
FIG. 11 is a perspective view illustrating a pallet for assembling rotors.
Figure 17:
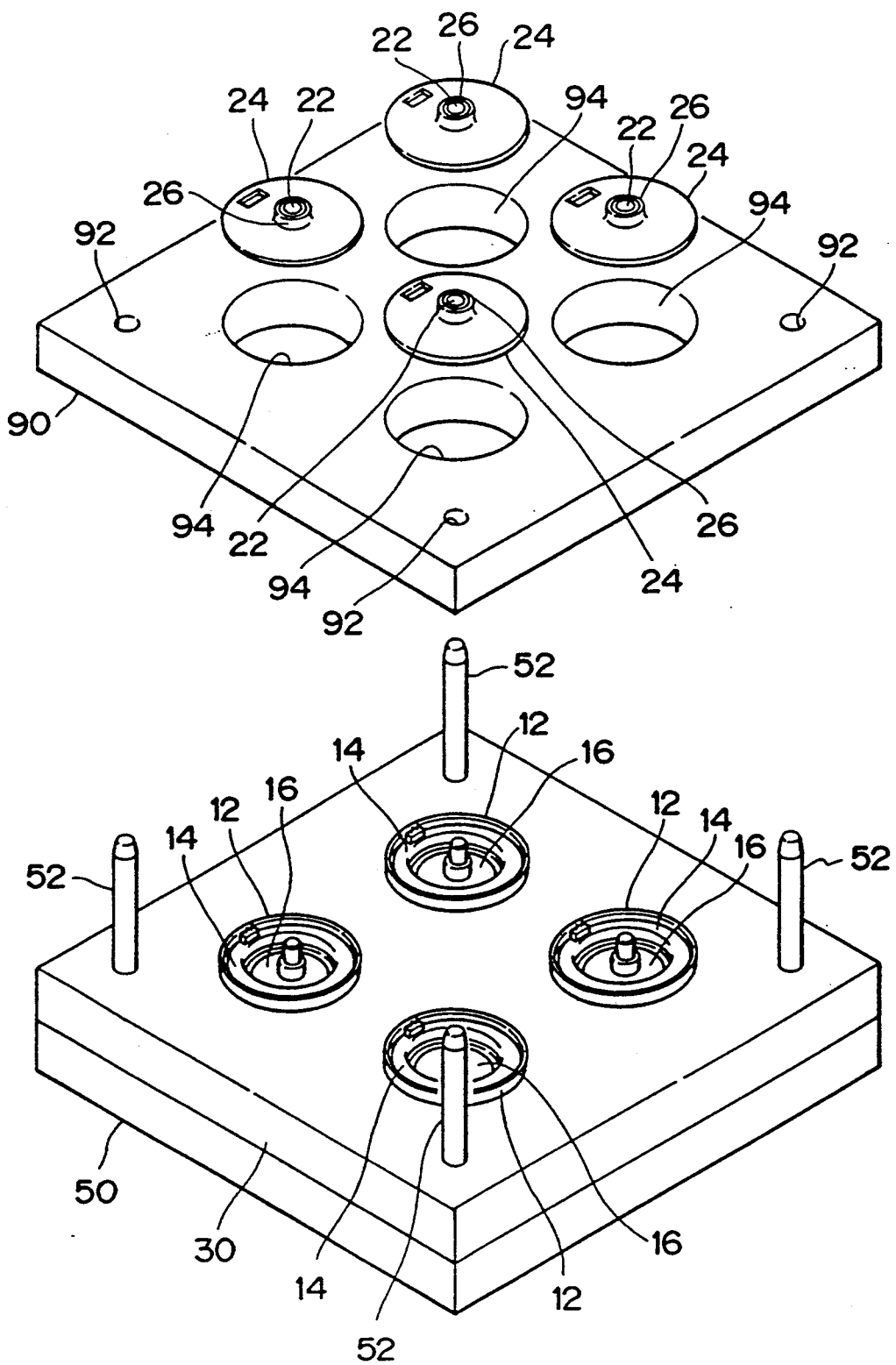
FIG. 17 is a perspective view illustrating a pallet for assembling the end plates.

In addition, as shown in FIGS. 8, 11, and 17, the container pallets 74, 82, 90 basically have the same structure as the container pallet 60, and are provided in correspondence with the stators 14, rotors 16, and end covers 24, respectively. As the guide rods 52 on the base pallet 50 are inserted into guide holes 76, 84, 92, the respective container pallets 74, 82, 90 can always be superposed on the base pallet 30 in proper alignment therewith after the base pallet 30 is superposed on the base pallet 50.

Figure 9:
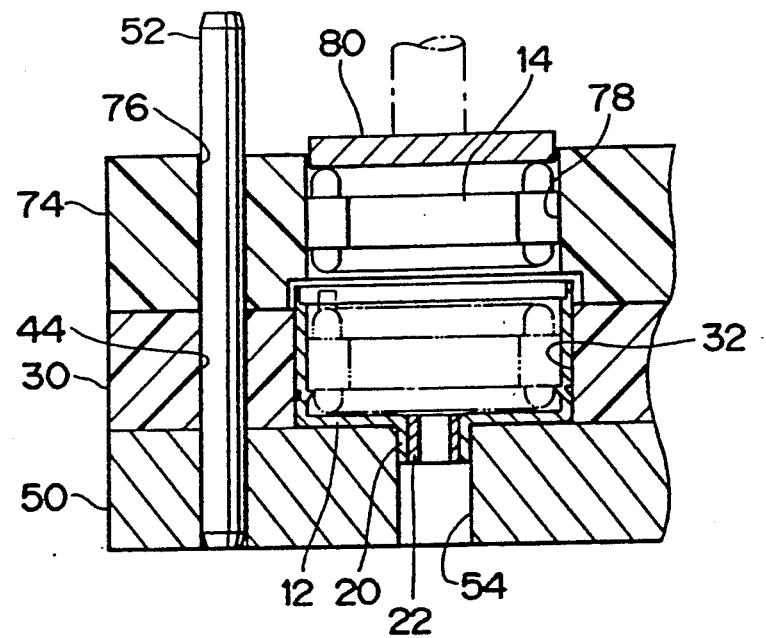
FIGS. 9 and 10 are partial cross-sectional views illustrating a state in which the stator is assembled.
Figure 12:
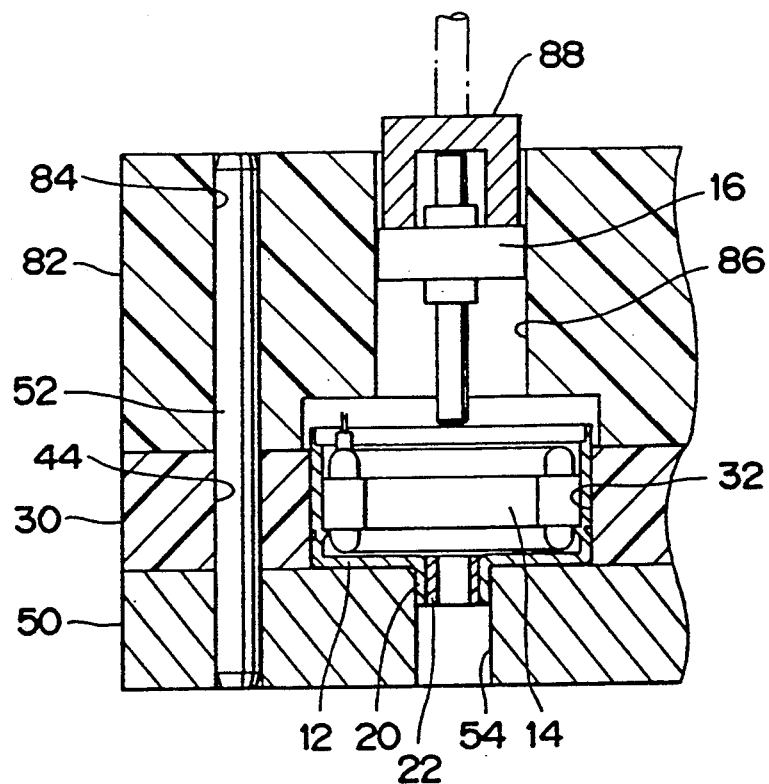
FIGS. 12 and 13 are partial cross-sectional views illustrating a state in which the rotor is assembled.
Figure 18:
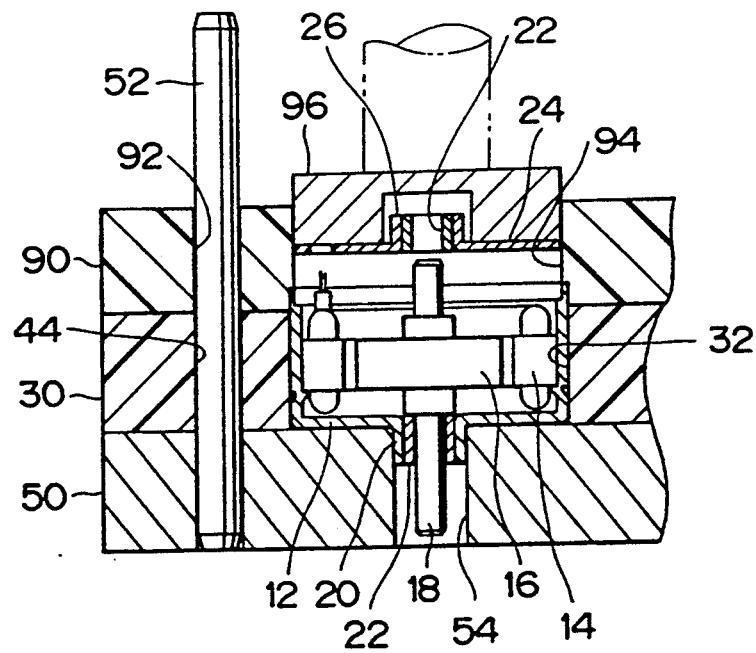
FIGS. 18 and 19 are partial cross-sectional views illustrating a state in which the end plate is assembled.

As shown in FIGS. 9, 12, and 18, holding holes 78, 86, 94 are formed in the container pallets 74, 82, 90, respectively. The holding holes 78, 86, 94 are capable of holding the stators 14, rotors 16, and end covers 24, respectively, by means of a holding mechanism similar to that of the holding hole 32 of the base pallet 30. When the container pallets 74, 82, 90 are respectively superposed on the base pallet 30, the holding holes 78, 86, 94 are adapted to be aligned with the holding holes 32 and the through holes 54 of the base pallet 50.

The pushers 80, 88, 96 correspond to the container pallets 74, 82, 90, respectively, and are capable of being inserted into the respective holding holes 78, 86, 94 of the container pallets 74, 82, 90. The pushers 80, 88, 96, when fitted in the respective holding holes 78, 86, 94, are capable of pushing the stators 14, rotors 16, and end covers 24 that are held in the holding holes 78, 86, 94, and of pushing them outwardly of the holding holes 78, 86, 94.

Figure 20:
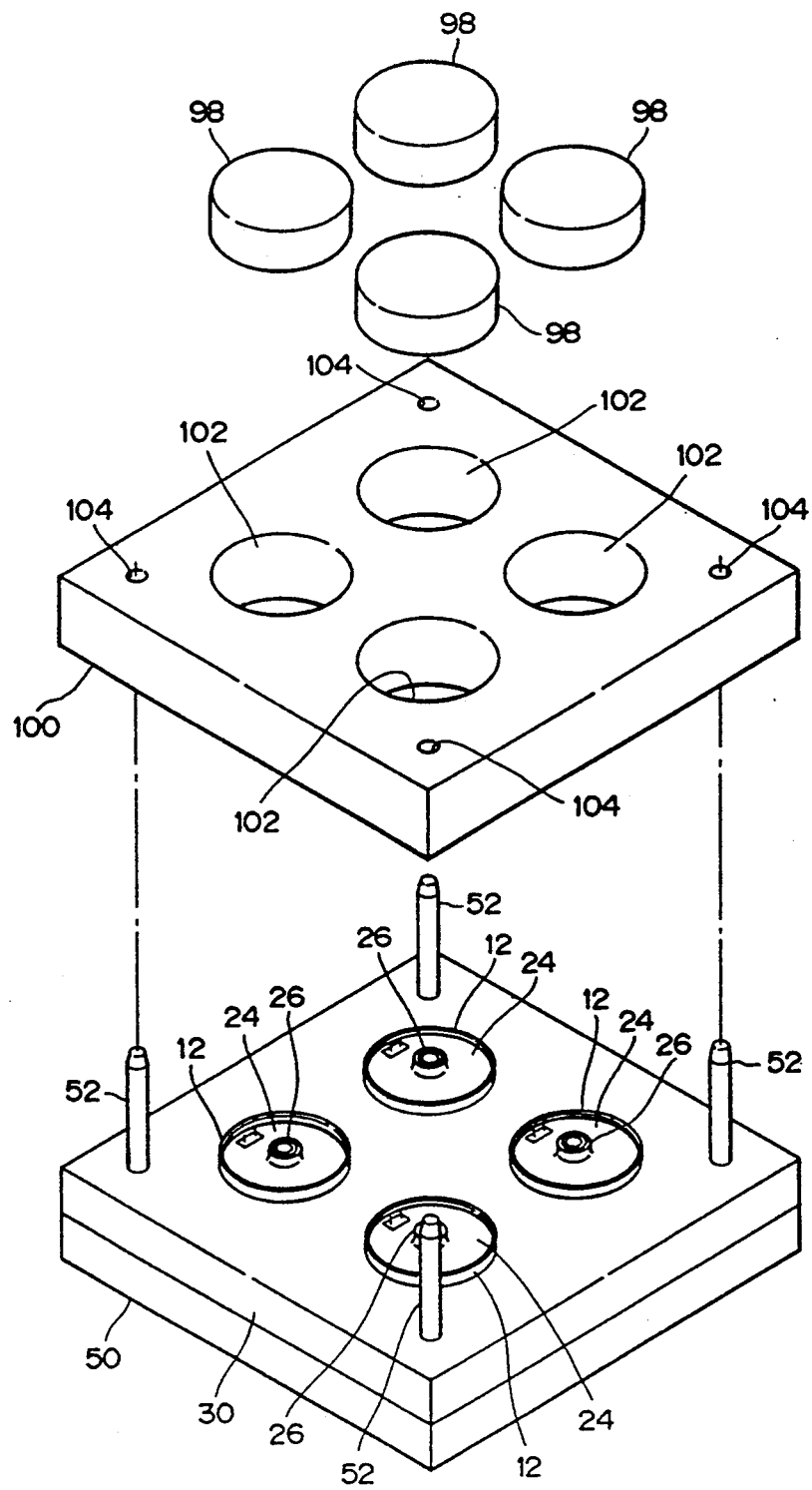
FIG. 20 is a perspective view illustrating a pallet for holding calking tools.
Figure 21:
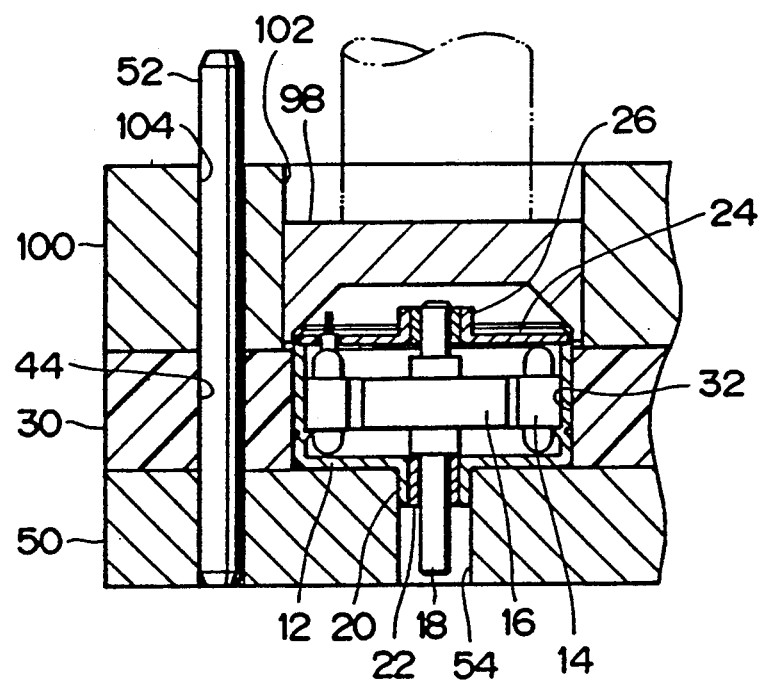
FIG. 21 is a partial cross-sectional view illustrating a state in which the end plate is calked.

As shown in FIG. 20, the calking tools 98 are respectively held in guide holes 102 formed in a guide pallet 100 in correspondence with the holding holes 32 of the base pallet 30. The tip of each calking tool 98 is provided with a cavity in such a manner as to form a tapered rim, as shown in FIG. 21. The calking tool 98 is capable of pressing an upper end of the yoke 12 held in the holding hole 32. That is, as the guide rods on the base pallet 50 are respectively inserted into guide holes 104 provided in the guide pallet 100, the calking tools 98 can be aligned with the holding holes 32 when the guide pallet 100 is superposed on the base pallet 30, as shown in FIG. 21. When the calking tools 98 are pushed in in this state, the upper ends of the yokes 12 held in the holding holes 32 are calked inward in the radial direction.

A description will now be given of the procedures of assembling the motor 10 by using the above-described apparatus for assembling component parts.

First, as shown in FIG. 2, the yokes 12 are respectively inserted into and held in the holding holes 32 of the base pallet 30. In addition, the sintered bearings 22, stators 14, rotors 16, and end covers 24 are held in the respective container pallets 60, 74, 82, 90 (first step).

Upon completion of the foregoing first step, the base pallet 50 is superposed on the base pallet 30. This completes a preparatory stage of assembly.

Figure 7:
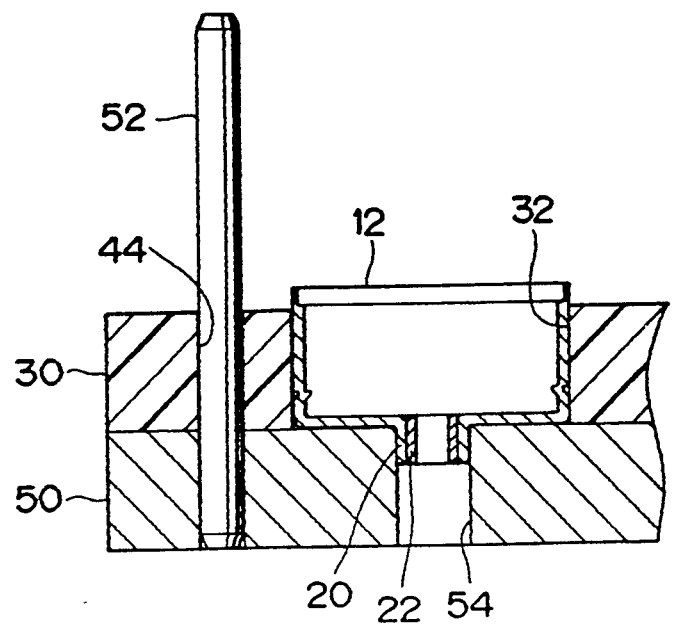

Then, as shown in FIG. 6, the container pallet 60 with the sintered bearings 22 held therein is superposed on the base pallet 30 with the holding state being maintained intact. In this state, the sintered bearings 22 are held coaxially with the respective yokes 12 (bearing portions 20). Then, the sintered bearings 22 are respectively pushed into the bearing portions 20 of the yokes 12 held in the base pallet 30 by means of the pushers 70, so as to allow the sintered bearings 22 to be assembled to the bearing portions 20 (second step). As a result, each sintered bearing 22 is assembled as shown in FIG. 7.

Figure 10:
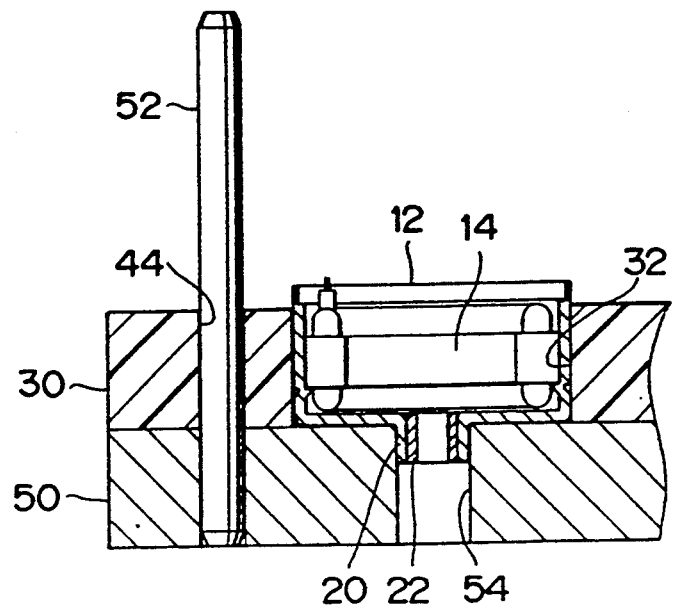

After the second step, without removing the yokes 12 with the sintered bearings 22 assembled thereto from the base pallet 30, i.e., while maintaining the holding state intact, the container pallet 74 having the stators 14 held therein is superposed on the base pallet 30, as shown in FIG. 9. In this state, the stators 14 are held coaxially with the yokes 12. Then, the stators 14 are respectively pushed into the yokes 12 held in the base pallet 30 by means of the pushers 80 so as to allow the stators 14 to be assembled to the yokes 14 (third step). As a result, each stator 14 is assembled as shown in FIG. 10.

Figure 13:
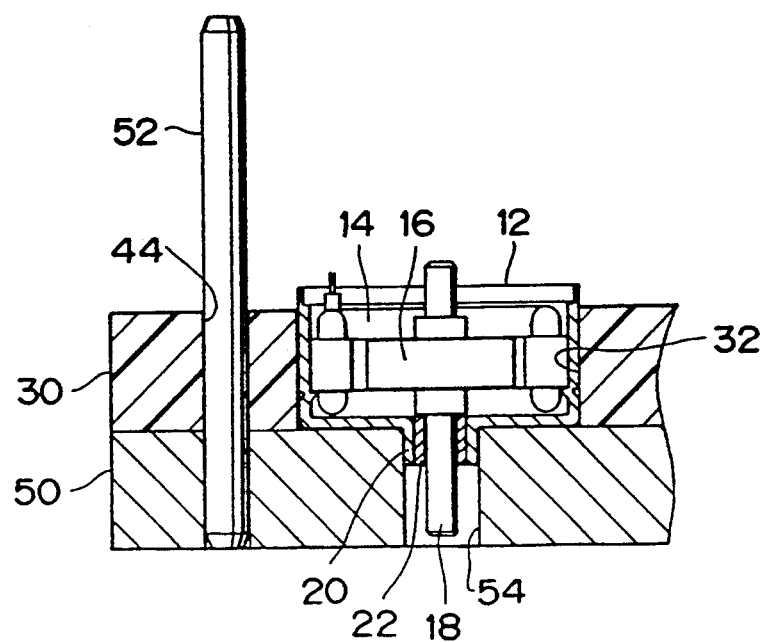
Figure 14:
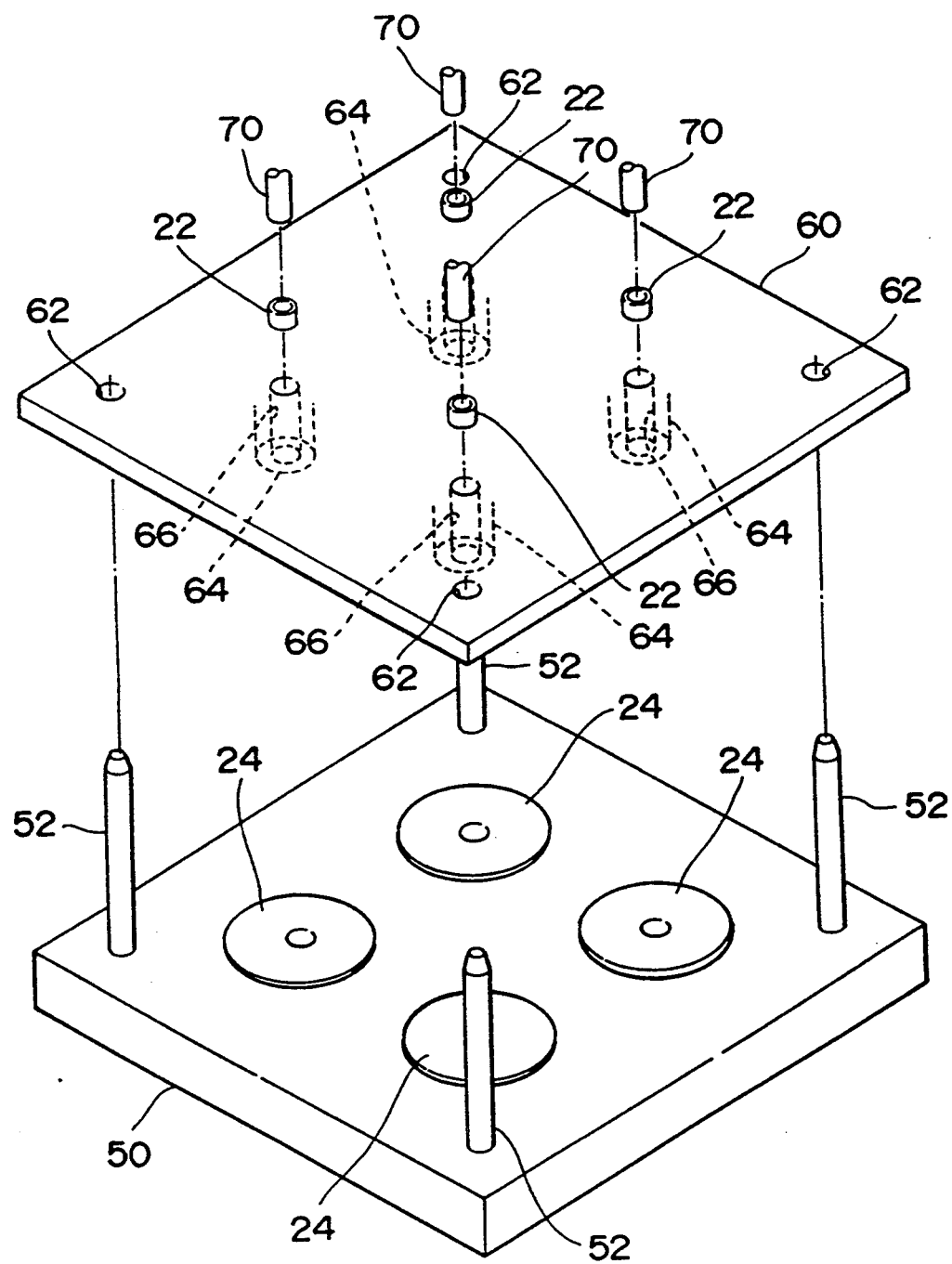
FIG. 14 is a perspective view illustrating a pallet for assembling sintered bearings to end plates.

After the stators 14 are assembled to the yokes 12, without removing the yokes 12 with the stators 14 assembled thereto from the base pallet 30, i.e., while maintaining the holding state intact, the container pallet 82 having the rotors 16 held therein is superposed on the base pallet 30, as shown in FIG. 12. In this state, the rotors 16 are held coaxially with the yokes 12. Furthermore, the rotors 16 are respectively pushed into the yokes 12 held in the base pallet 30 by means of the pushers 88 so as to allow the rotors 16 to be assembled to the yokes 12 (third step). As a result, each rotor 16 is assembled as shown in FIG. 13.

Figure 15:
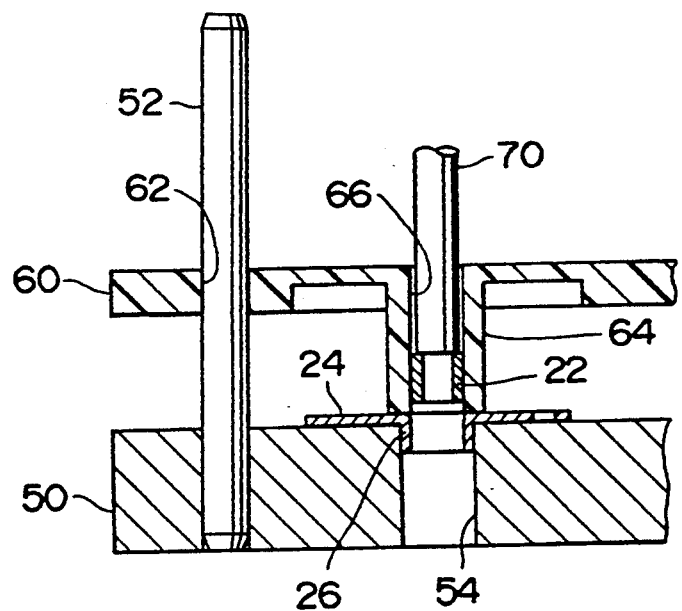
FIGS. 15 and 16 are partial cross-sectional views illustrating a state in which the sintered bearing is assembled to the end plate.
Figure 16:
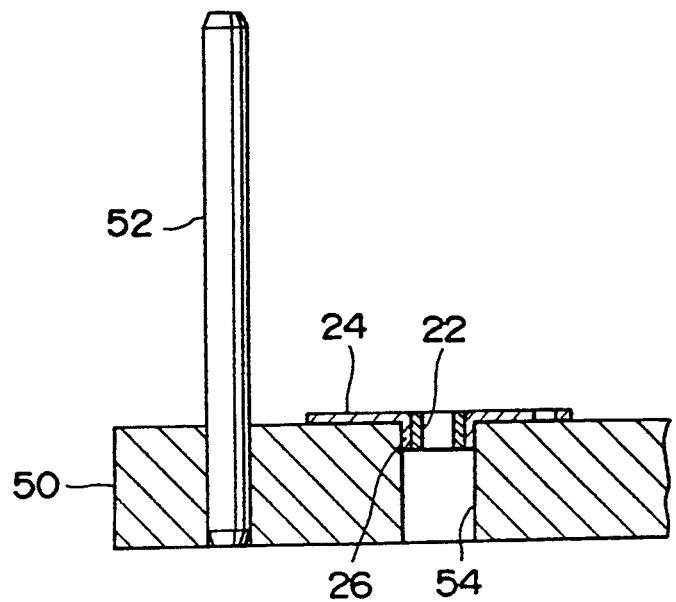

Meanwhile, as shown in FIG. 15, the end covers 24 are fitted and held in the through holes 54 of the base pallet 50, and the container pallet 60 with the sintered bearings 22 held therein is superposed on the base pallet 50. Then, the sintered bearings 22 are pushed in by means of the pushers 70 so ss to allow the sintered bearings 22 to be assembled to the bearing portions 26 of the end covers 24 held in the base pallet 50 (a step equivalent to the second step). As a result, each sintered bearing 22 is assembled to the end cover 24 as shown in FIG. 16.

Figure 19:
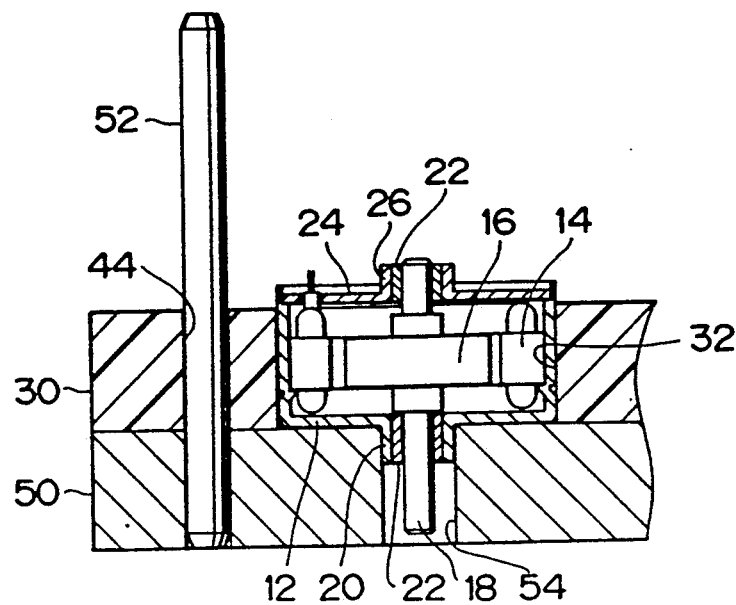

Then, as shown in FIG. 17, the end covers 24 with the respective sintered bearings 22 assembled thereto are fitted in and held by the container pallet 90, and this container pallet 90 is superposed on the base pallet 30 with the yokes 12 held therein, as shown in FIG. 18. Then, the end covers 24 are pushed in by means of the pushers 96 into the yokes 12 held in the base pallet 30 so as to allow the end covers 24 to be assembled to the yokes 12 (third step). As a result, each end cover 24 is assembled as shown in FIG. 19.

Figure 22:
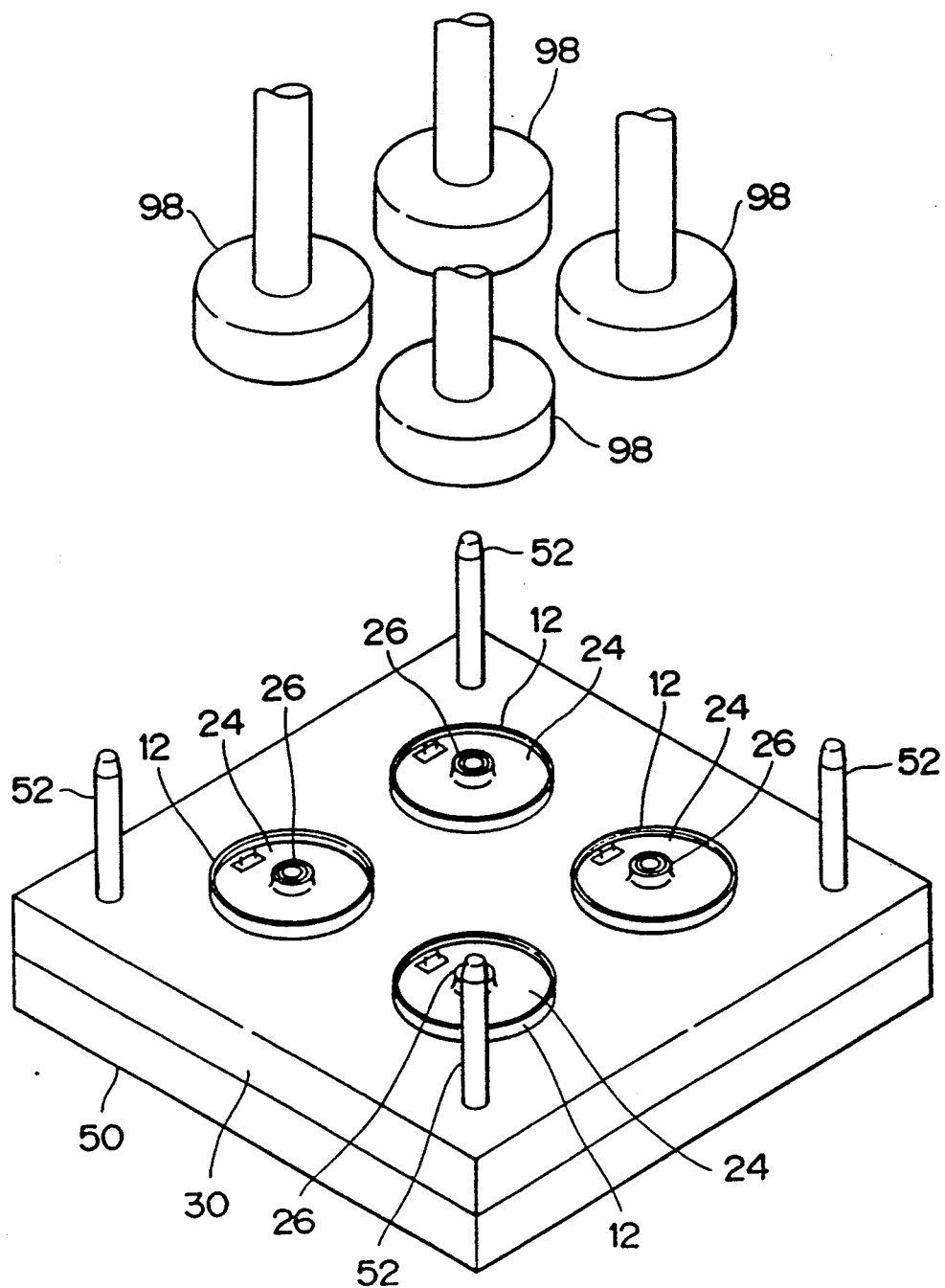
FIG. 22 is a perspective view illustrating another example of calking tools.
Figure 23:
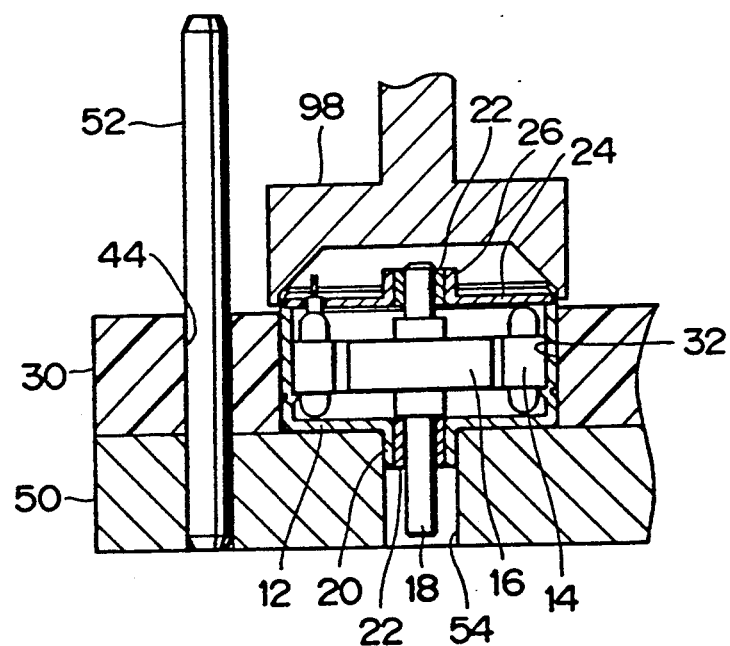
FIG. 23 is a partial cross-sectional view of a base pallet corresponding to FIG. 22 illustrating another example of calking tools.

Subsequently, as shown in FIG. 21, the guide pallet 100 holding the calking tools 98 is superposed on the base pallet 30. The upper ends of the yokes 12 are then pressed by the calking tools 98 and are thereby calked inwardly in the radial direction, so as to secure the end covers 24 to the yokes 12. It should be noted that, in this case, if an arrangement is provided as shown in FIGS. 22 and 23 such that each calking tool 98 is disposed coaxially with the yoke 12 and presses the upper end of the yoke 12, the calking tool 98 need not be held by the guide pallet 100.

This completes the assembly of the motor 10.

Thus, in this embodiment, the assembling process can be effected in the above-described simple stages in which after the container pallets 60, 74, 82, 90 (superposing jigs) are respectively superposed on an assembly of the base pallets 30, 50 (reference jigs), component parts such as the sintered bearings 22, stators 14, rotors 16, and end covers 24 are consecutively pushed in by the pushers 70, 80, 88, 96 (assembling jigs), respectively. Hence, the operational efficiency can be improved. In addition, by repeating the third step after the second step in correspondence with the number of kinds of component parts used, it is possible to effect assembly easily even in cases where the number of kinds of component parts is numerous, so that the applicable range of production expands.

In addition, since the component parts are held in the state of being consecutively assembled in the base pallet 30 on the occasion of each assembly process, the component parts thus held can be transported or stored in the partly assembled state.

Since a plurality of (in this embodiment four) component parts of the motor 10 are assembled simultaneously while being held by the base pallet 30 and the container pallets, the operational efficiency is improved remarkably. It should be noted that although in the above-described embodiment the arrangement provided is such that four component parts of the motor 10 are held and assembled simultaneously, the present invention is not restricted to the same, and the number of component parts may be increased or decreased appropriately, as desired.

Figure 24:
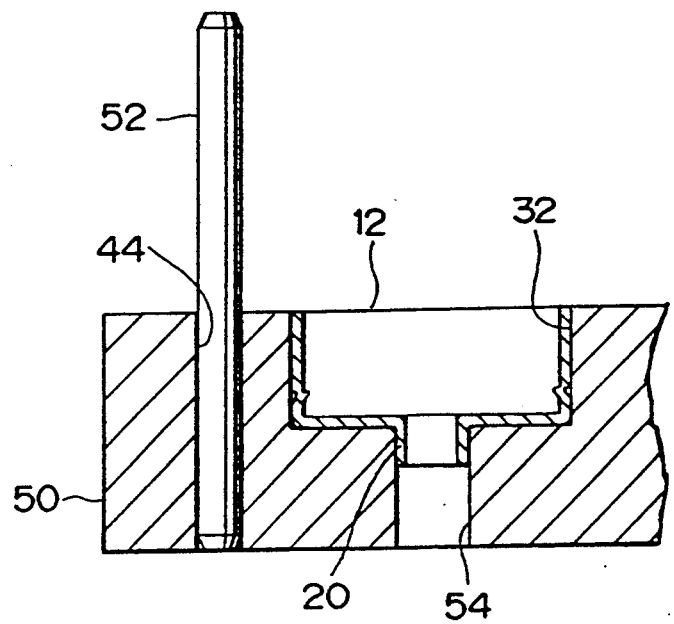
FIGS. 24A and 24B are partial cross-sectional views illustrating another example of base pallets.
Figure 24:
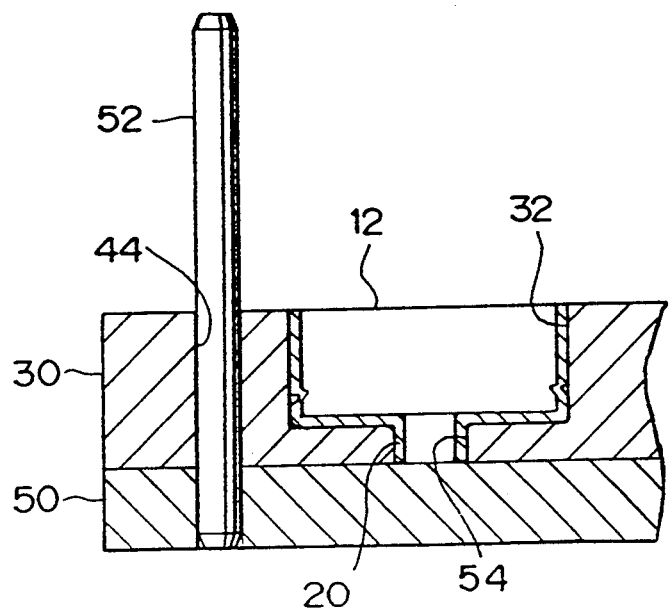

Although in the above-described embodiment the reference jigs are comprised of two members, i.e., the base pallets 30, 50, the present invention is not restricted to the same, and as shown in FIG. 24A, the base pallets 30, 50 may be formed integrally so as to be formed into a single reference jig.

Additionally, although in the above-described embodiment a description has been given of a case in which the bearing portions 20 of the yokes 12 are fitted in the respective through holes 54 formed in the base pallet 50, and the yokes 12 are supported by the base pallets 30, 50, the present invention is not restricted to the same. For instance, as shown in FIG. 24B, an arrangement may be alternatively provided such that the through holes 54 allowing the bearing portions 20 to be inserted therein are formed in the base pallet 30, and the yokes 12 are held by the base pallet 30 only.

As described above, the method and apparatus for assembling component parts in accordance with the present invention offers outstanding advantages in that, in assembling component parts of products manufactured by assembling a plurality of component parts coaxially, it is possible to set assembling processes continuously and assemble a plurality of products simultaneously, thereby substantially improving the assembling efficiency, and that the component parts can be transported or stored in a state in which they are partly assembled.

What is claimed is:

1. An apparatus for assembling component parts of a product manufactured by assembling a plurality of kinds of component parts coaxially, comprising:
    a reference jig provided with at least one aperture and including holding means, positioned adjacent said at least one aperture and separate therefrom for holding a component part of one of said plurality of kinds in said at least one aperture of said reference jig;
    a superposing jig provided with at least one aperture and including holding means, positioned adjacent said at least one aperture and separate therefrom, for holding a component part of another kind of said plurality of kinds in said at least one aperture of said superposing jig;
    guide means for guiding said superposing jig toward said reference jig in such a manner that an axis of said component part held by said superposing jig is aligned with an axis of said component part held by said reference jig; and
    an assembling jig for assembling said component part held by said superposing jig to said component part held by said reference jig.

2. The apparatus for assembling component parts according to claim 1, wherein said guide means comprises a guide rod disposed on said reference jig and a guide hole provided in said superposing jig.

3. The apparatus for assembling component parts according to claim 1, wherein said holding means of said reference jig and said superposing jig are each operable to hold one of said component parts by exerting a force perpendicularly to the axis of said component part.

4. The apparatus for assembling component parts according to claim 3, wherein at least one of said holding means projects into a path of movement of the respective component part held therein and is operable to hold said respective component part by undergoing resilient deformation as said respective component part is inserted thereinto.

5. The apparatus for assembling component parts according to claim 3, wherein at least one of said holding means includes a magnet and is operable to hold one of said component parts by a magnetic force produced by said magnet.

6. The apparatus for assembling component parts according to claim 3, wherein at least one of said holding means includes a compression spring and is operable to hold one of said component parts by a pressing force produced by said compression spring.

7. The apparatus for assembling component parts according to claim 3, wherein the holding means of said reference jig comprises a holding plate for holding one of said component parts and provided with a tabular portion projecting perpendicularly to the axis of said component part in such a manner as to prevent said component part from falling by its own weight from said reference jig.

8. The apparatus for assembling component parts according to claim 1, wherein said assembling jig comprises pressing means for coaxially moving the component part held by the holding means of said superposing jig and causing said component part to be fitted to the component part held by the holding means of said reference jig.

9. The apparatus for assembling component parts according to claim 1, wherein said assembling jig comprises calking means for moving coaxially and calking the component part held by the holding means of said reference jig.

10. The apparatus for assembling component parts according to claim 9, further comprising a guide pallet, wherein said calking means is held by said guide pallet such that said calking means can approach a component part held by said reference jig in such a manner that an axis of said calking means is aligned with the axis of said component part.

11. The apparatus for assembling component parts according to claim 9, further comprising a guide shaft, wherein said calking means is held by said guide shaft such that said calking means can approach a component part held by said reference jig in such a manner that an axis of said calking means is aligned with the axis of said component part.

12. An apparatus for assembling component parts of a product manufactured by assembling a plurality of kinds of component parts coaxially, comprising:
    a reference jig provided with at least one aperture and including holding means, positioned adjacent said at least one aperture and separate therefrom, for holding a component part of one of said plurality of kinds in said at least one aperture of said reference jig;
    a superposing jig provided with at least one aperture and including holding means, positioned adjacent said at least one aperture and separate therefrom, for holding a subassembly of component parts of a plurality of other kinds assembled in advance among said plurality of kinds in said at least one aperture of said superposing jig;

guide means for guiding said superposing jig toward said reference jig in such a manner that an axis of said subassembly held by said superposing jig is aligned with an axis of said component part held by said reference jig; and an assembling jig for assembling said subassembly held by said superposing jig to said component part held by said reference jig.

13. The apparatus for assembling component parts according to claim 12, wherein said guide means comprises a guide rod disposed on said reference jig and a guide hole provided in said superposing jig.

14. The apparatus for assembling component parts according to claim 12, wherein holding means of said reference jig and said superposing jig are each operable to hold one of said component parts or said subassembly, respectively, by exerting a force perpendicularly to the axis of said component part or said subassembly, respectively.

15. The apparatus for assembling component parts according to claim 14, wherein said holding means of said reference jig projects into a path of movement of the respective component part held therein and is operable to hold said respective component part by undergoing resilient deformation as said respective component part is inserted thereinto.

16. The apparatus for assembling component parts according to claim 14, wherein said holding means of said reference jig includes a magnet and is operable to hold one of said component parts by a magnetic force produced by said magnet.

17. The apparatus for assembling component parts according to claim 14, wherein said holding means of said reference jig includes a compression spring and is operable to hold one of said component parts by a pressing force produced by said compression spring.

18. The apparatus for assembling component parts according to claim 14, wherein the holding means of said reference jig comprises a holding plate for holding one of said component parts and provided with a tabular portion projecting perpendicularly to the axis of said component part in such a manner as to prevent said component part from falling by its own weight from said reference jig.

19. The apparatus for assembling component parts according to claim 12, wherein said assembling jig comprises pressing means for coaxially moving said subassembly held by said holding means of said superposing jig and causing said subassembly to be fitted to the component part held by the holding means of said reference jig.

20. The apparatus for assembling component parts according to claim 12, wherein said assembling jig comprises calking means for moving coaxially and calking the component part held by the holding means of said reference jig.

21. The apparatus for assembling component parts according to claim 20, further comprising a guide pallet, wherein said calking means is held by said guide pallet such that said calking means can approach a component part held by said reference jig in such a manner that an axis of said calking portion is aligned with the axis of said component part.

22. The apparatus for assembling component parts according to claim 20, further comprising a guide shaft, wherein said calking means is held by said guide shaft such that said calking means can approach a component part held by said reference jig in such a manner that an axis of said calking means is aligned with the axis of said component part.

23. An apparatus for assembling component parts of a product manufactured by assembling a plurality of kinds of component parts coaxially, comprising:

a reference jig having a plurality of apertures and a plurality of holding means, positioned adjacent corresponding said apertures and separate therefrom, for holding a plurality of component parts of one of said plurality of kinds in respective ones of said one apertures of said reference jig;

superposing jigs each having a plurality of apertures and a plurality of holding means, positioned adjacent corresponding said apertures and separate therefrom, for holding a plurality of component parts of respectively another one of said plurality of kinds in respective said apertures of said superposing jigs;

guide means, comprising a guide rod disposed on said reference jig and a guide hole provided in at least one of said superposing jigs, for guiding said at least one of said superposing jigs toward said reference jig so as to cause said at least one of said superposing jig to approach said reference jig in such a manner that an axis of the component parts held by said superposing jig is aligned with an axis of each of the component parts held by said reference jig; and assembling jig means for respectively assembling said component parts held by said superposing jig to said component parts held by said reference jig, by pushing the component parts held by said superposing jig toward the component parts held by said reference jig.

24. The apparatus for assembling component parts according to claim 23, wherein the holding means of at least one said superposing jig is operable to hold subassemblies of a plurality of kinds of component parts for simultaneous assembly of a plurality of pieces of a product.

* * * * *